United States Patent [19]

Carlson et al.

[11] Patent Number: 4,937,540
[45] Date of Patent: Jun. 26, 1990

[54] FILTER FOR SWITCHMODE POWER CONVERTERS

[75] Inventors: Peter J. Carlson, Raleigh, N.C.; Ram Rajagopalan, Moutainview, Calif.

[73] Assignee: Harris Semiconductor Patents, Inc., Melbourne, Fla.

[21] Appl. No.: 209,940

[22] Filed: Jun. 22, 1988

[30] Foreign Application Priority Data

Jun. 24, 1987 [GB] United Kingdom ............... 8714755

[51] Int. Cl.⁵ .................. H04B 3/28; H02M 1/14
[52] U.S. Cl. ................................ 333/12; 333/181; 363/39; 363/47
[58] Field of Search ............. 333/12, 24 R, 167, 177, 333/181, 184, 185; 363/47, 39

[56] References Cited

U.S. PATENT DOCUMENTS

| 1,017,634 | 2/1912 | Campos | 333/177 X |
| 1,822,929 | 9/1931 | Hand | 333/181 |
| 3,223,920 | 12/1965 | Sasaki | 333/12 X |
| 4,760,356 | 7/1988 | Kempster | 333/177 |

OTHER PUBLICATIONS

F. E. Rogers–"The Theory of Electrical Networks in Electrical Communication and Other Fields", MacDonald, London, 1957; pp. 136–137.

Primary Examiner—Eugene R. Laroche
Assistant Examiner—Seung Ham
Attorney, Agent, or Firm—Henry I. Schanzer

[57] ABSTRACT

Damping resistance is introduced via transformer coupling into a circuit which includes an inductance-capacitance (LC) filter arrangement to smooth the current pulses applied to a load.

5 Claims, 4 Drawing Sheets

FILTER FOR SWITCHMODE POWER CONVERTERS

BACKGROUND OF THE INVENTION

This invention relates to filters and in particular to low pass filter circuit arrangements.

In many applications a power source, such as a car battery, is intermittently applied (switched) to a load. The application of current pulses to a load results in the generation of unwanted electromagnetic noise signals which may interfere with the proper operation of the load and the control circuitry, and other circuits operated from the same power source as the load. It is therefore desirable and/or necessary to filter the power pulses and smooth the current pulses flowing between the power source and the load.

Accordingly, this invention relates to filters and, in particular, to filters using passive reactive components such as inductors and capacitors to provide significant attenuation at high frequencies.

SUMMARY OF THE INVENTION

In a circuit embodying the invention, the resonance peaking of a conventional inductor and capacitor filter is nullified by the introduction of a damping resistance via transformer coupling. Components integrating different reactive components (e.g. inductors and transformers) into a single magnetic structure also forms a part of this invention. These structures indicate that the low pass circuit of the invention can be made economically and with enhanced reliability characteristics.

BRIEF DESCRIPTION OF THE DRAWING

In the accompanying drawing like reference characters denote like components.

FIG. 7b is an equivalent circuit diagram of the transformer T1 of FIG. 7a;

DETAILED DESCRIPTION OF THE INVENTION

Figure 1:
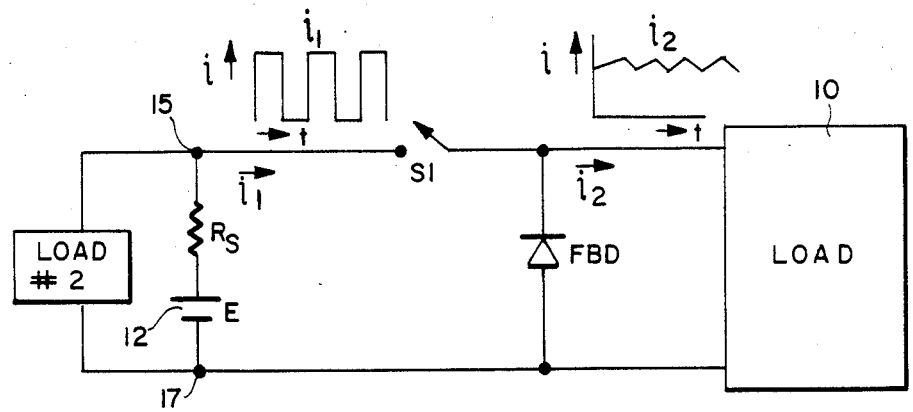
FIG. 1 is a schematic diagram of a prior art switching regulator circuit.

The invention may be best understood by first considering the prior art switched mode converter circuit shown in FIG. 1.

Figure 2A:
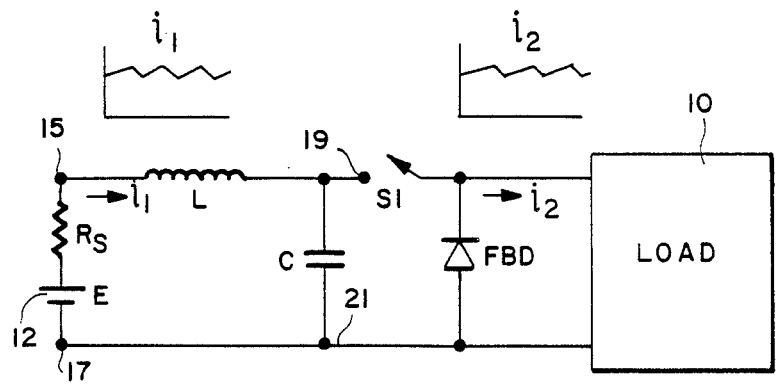
FIG. 2a is a schematic diagram of a prior art switching regulator circuit with an input filter.

FIG. 1 shows a conventional switching regulator feeding a load 10, which may be, for example, a motor, such as a windshield wiper motor. A power source 12, which may be a car battery, provides the operating voltage and current for the system. A switch S1, which may be any suitable semiconductor switch, is periodically opened and closed to provide pulses of current to load 10. The full-on to full-off pulsed switching current ($i_1$) at the source 12 generates considerable electromagnetic interference (EMI) which is objectionable to the other loads, such as load 2, connected to source 12, to switch S1 and to the control circuity for switch S1 (not shown). A low pass passive input filter may be incorporated between the source 12 and the switching converter, as shown in FIG. 2a, to smooth the current (see $i_1$ in FIG. 2a compared to $i_1$ in FIG. 1) drawn from the source 12 to an average value and a ripple at the switching frequency, thereby reducing the EMI. The low pass filter includes an inductor, L, connected between terminals 15 and 19 and a capacitor, C, connected between terminals 19 and 21.

Figure 2B:
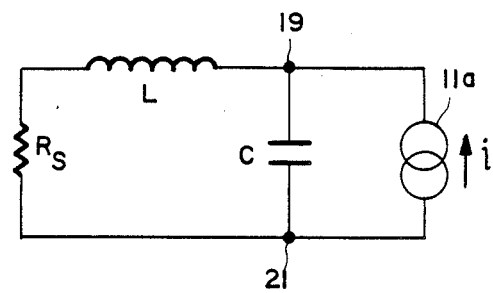
FIG. 2b is a simplified equivalent circuit diagram of the filter circuit of FIG. 2a in which current source 11a represents switch S1, fly back diode (FBD) and the load.

FIG. 2b shows the equivalent circuit for evaluating the discontinuous current flowing into the load and fly back diode (FBD) in the circuit of FIG. 2a. The low pass input filter may be connected between power terminals 15 and 17, and terminals 19 and 21, where terminal 21 may be common to terminal 17. The circuit of FIG. 2a shows one filter stage. However, the low pass input filter may be comprised of more than one stage. The number of stages of L-C filters is set by attenuation requirements which will satisfy the EMI specifications. However, such reactive filters exhibit resonance at the corner frequency with the gain being limited by the total resistance in the network, namely the source resistance of the power source and series resistance of the inductors and wires represented by Rs in the drawing. Normally these resistances are made to have a low ohmic value due to the requirements of low DC power loss and as a result any transients such as sudden load change will cause high amplitude oscillations with a very low damping coefficient. The oscillations are undesirable and damping means must be provided to limit the amplitude of the oscillations.

Figure 3:
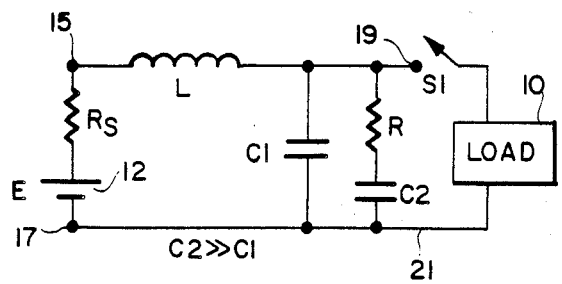
FIGS. 3 and 4 are schematic diagrams of prior art circuits including damping.

To dampen high amplitude oscillations, known prior art implementations teach the use of a damping resistor R in series with a capacitor C2 connected between terminals 19 and 21, as shown in FIG. 3. The capacitor C2 should be of high value compared to C1 and hence costly.

Figure 4:
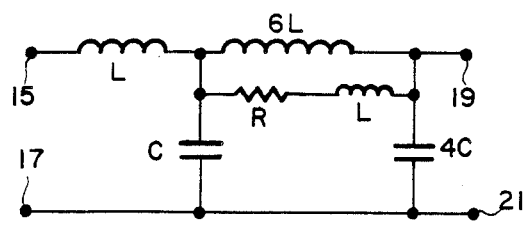

Another prior art filter circuit for achieving the required damping function is shown in FIG. 4. This circuit is also undesirable because of the large and costly inductance (e.g. 6L) and capacitance (e.g. 4C) required by the circuit.

Except for the disadvantagers noted above, the filters of FIGS. 3 and 4, also known as Butterworth filters, are generally good choices in applications for power filtering since such filters provide low ripple characteristics in the pass band and attenuation in the stop band. An expression denoting the relationship between the required attenuation level, the order of the filter, the operating frequency and the corner frequency is set forth in equation 1 below.

$$1/[1+(w/w_c)n] = \text{Required attenuation} \qquad \text{eq. 1}$$

where w is the operating frequency in radians and is the rate at which S1 is turned on and off;

$w_c$ is the corner frequency; and n is the order of the filter

Figure 5:
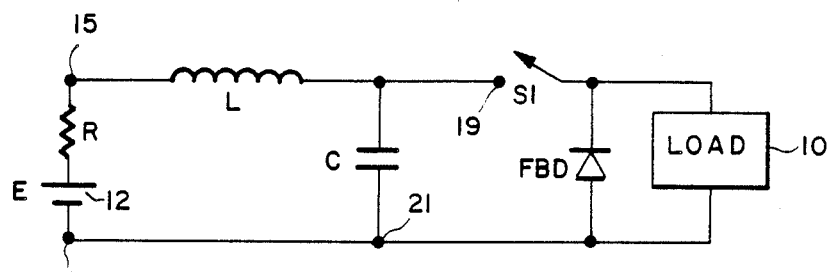
FIG. 5 is a simplified equivalent schematic diagram identifying the circuit of FIG. 2a as a second order filter.
Figure 6:
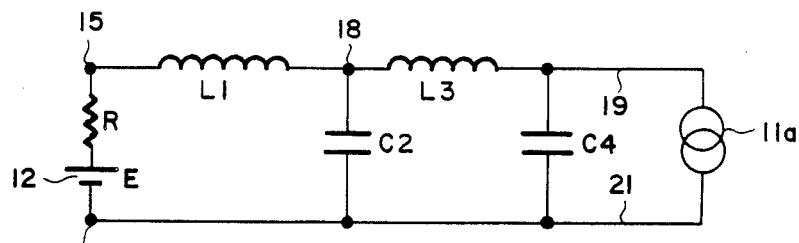
FIG. 6 is a simplified equivalent circuit of a fourth order filter with current source 11a representing switch S1, fly back diode (FBD) and the load.

A second (2nd) order filter and a fourth (4th) order filter may be formed as shown in FIGS. 5 and 6, respectively. Using classical design methods and by mathematical interpretations, the component values of the filters can be determined, as discussed below for a second (2nd) and fourth (4th) order filter, for their corresponding cutoff frequencies $w_c$.

The values of inductance and capacitance needed to form the second (2nd) order filter may be calculated from published tables for prototype filters. The inductive and capacitive values of the second (2nd) order filter shown in FIG. 5 may be expressed as follows:

$$L = 0.707 * R/w_c \text{ Henries}; \quad \text{eq. } 2a$$

$$C = 1.414/(R * w_c) \text{ Farads}; \quad \text{eq. } 2b$$

The values of inductance and capacitance needed to form the fourth (4th) order filter also may be calculated from published tables for prototype filters. The values of the inductors and capacitors for the fourth (4th) order filter shown in FIG. 6, may be expressed as follows:

$$L_1 = 0.3827 * R/w_c \text{ Henries}; \quad \text{eq. } 3a$$

$$C_2 = 1.082/(R * w_c) \text{ Farads}; \quad \text{eq. } 3b$$

$$L_3 = 1.577 * R/w_c \text{ Henries}; \quad \text{eq. } 3c$$

$$C_4 = 1.531/(R * w_c) \text{ Farads}; \quad \text{eq. } 3d$$

where R represents the total resistance in series with, as well as, the internal resistance of, the power source 12.

An examination of equations 2a, 2b, and 3a through 3d shows that the inductance is directly proportional to the resistance R, and the capacitor is inversely proportional to the resistance R. Therefore, the larger the resistance the smaller the needed filtering capacitance. A practical illustration indicates the effect of resistance R on the L-C values. For a switching frequency of 100 kHz, and a required attenuation of 60 db the values of different L-C combinations are calculated and tabulated below for different values of R.

| I - For the second (2nd) order filter with $w_c = 19.87$ krads. | | | | | | | |
|---|---|---|---|---|---|---|---|
| R | 0.1 | 0.5 | 1.0 | 2.0 | 5.0 | 10.0 | ohms |
| L | 3.56 | 17.79 | 35.58 | 71.16 | 177.9 | 355.8 | microhenries |
| C | 711.6 | 142.33 | 71.16 | 35.58 | 14.23 | 7.12 | microfarads |
| II - For the fourth (4th) order filter with $w_c = 111.74$ krads. | | | | | | | |
| R | 0.2 | 0.5 | 1.0 | 2.0 | 5.0 | 10.0 | ohms |
| $L_1$ | 0.34 | 1.72 | 3.42 | 6.85 | 17.12 | 34.25 | microhenries |
| $C_2$ | 96.83 | 19.37 | 9.68 | 4.84 | 1.94 | 0.97 | microfarads |
| $L_3$ | 1.41 | 7.06 | 14.11 | 28.23 | 70.57 | 141.13 | microhenries |
| $C_4$ | 137.01 | 27.4 | 13.7 | 6.85 | 2.74 | 1.37 | microfarads |

Applicants recognized that if the series resistance R were to be modified (i.e. increased) then the L and C values could be ratioed to have optimum values in terms of cost and performance. By reducing capacitor values, special electrolytic capacitors of large value may be replaced by smaller size paper or film capacitors. Electrolytic capacitors which have to be capable of withstanding high ripple currents and elevated temperatures are both costly and less reliable than film capacitors of equal physical size.

Figure 7A:
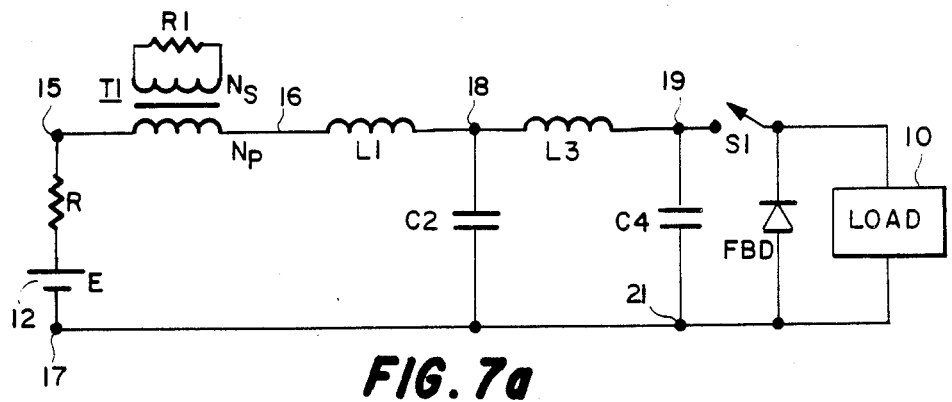
FIG. 7a is a schematic diagram of a circuit embodying the invention.

If resistance were to be added in a conventional manner in series with the inductance, the result would be poor regulation and an increased $I^2R$ loss. In FIG. 7a, the primary winding of a transformer T1 is connected between terminals 15 and 16 with inductor L1 connected between terminals 16 and 18 and inductor L3 being connected between terminals 18 and 19. A capacitor C2 is connected between terminal 18 and terminal 17, and a capacitor C4 is connected between terminals 19 and 21 which is in turn connected to terminal 17. FIG. 7a shows a fourth (4th) order filter with the primary winding of transformer T1 connected in the series path between terminals 15 and 16. A resistor $R_1$ is connected across the secondary of T1. The transformer T1 has a primary winding of $N_p$ turns, connected between terminals 15 and 16 and a secondary winding comprised of Ns turns, across which is connected the resistor R1. In the novel circuit shown in FIG. 7a, the resistance R1, connected across the secondary winding of transformer T1, is coupled or reflected in the series path through magnetic coupling. This increases the alternating current (AC) resistance in series with the power source 12 without substantially increasing the direct current (D.C.) resistance. So doing preserves the criteria of low loss, desired damping, and required attenuation.

The equivalent resistance $R_T$, reflected in the primary winding of T1, is then equal to $(R_1) \cdot (N_p/N_s)^2$, where $R_1$ represents the ohmic value of resistance R1.

The total equivalent alternating current (A.C.) resistance (R) between the power source 12 and terminal 19 is then the sum of Rs, which represents the internal power source impedance and associated wiring resistance, and the reflected resistance $R_T$, together with any resistance associated with inductors L1 and L3.

Figure 7B:
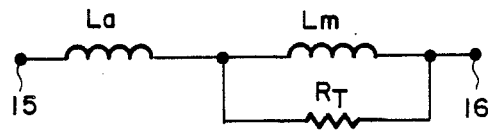

FIG. 7b shows the classical equivalent circuit of the transformer T1 with lumped leakage inductance $L_a$, the magnetizing inductance $L_m$ and the reflected resistance $R_T$. Thus, the total AC series resistance R is the sum of $R_S$ and $R_T$, which is used to determine the filter component values. However, the DC resistance is only increased by the resistance of the primary winding of T1. Thus, an increase in damping resistance has been achieved with very little $I^2R$ losses.

The inductor L1 and transformer T1 for the circuit of FIG. 7a may be formed in several different ways as shown in FIGS. 8 through 12.

Figure 8:
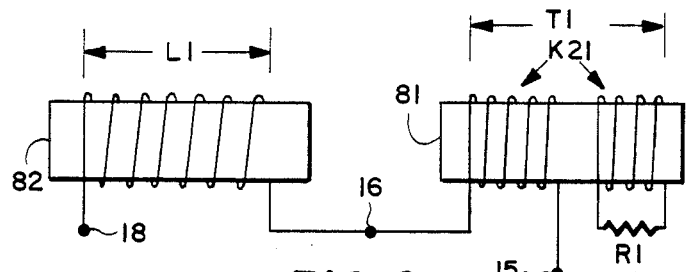
FIGS. 8, 9, 10, 11, and 12 are diagrams showing different inductor and transformer configurations suitable for use in circuits embodying the invention.

FIG. 8 realizes the inductance L1 and the transformer T1 as two separate conventional components. The primary and secondary windings of T1 are formed on one core, 81 and one inductor L1 is formed on another core, 82. The coupling coefficient K21 shown in FIG. 8 defines the coupling between the primary and secondary windings of T1.

Figure 9:
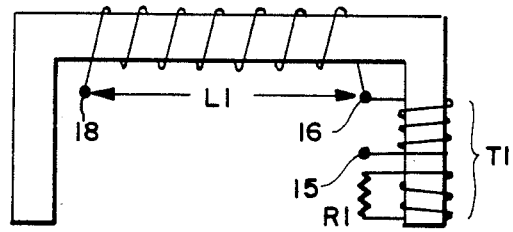

FIG. 9 shows the integration of the inductor L1 and the transformer T1 coupled resistor in an open magnetic frame. The orthogonal location of the L1 and T1 windings ensures minimum cross coupling, thereby preserving the individual identity of the inductor L1 and the transformer T1.

Figure 10:
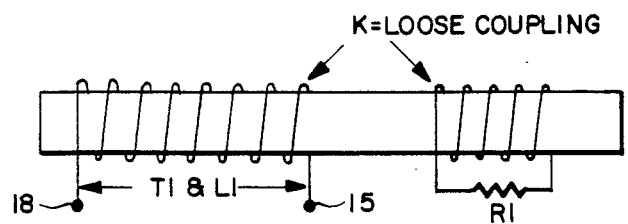

FIG. 10 illustrates a transformer configuration with resistor R1 connected across the secondary winding. The design basis is that the primary and secondary windings are loosely coupled together so that by the choice of spacing and winding geometry the necessary leakage inductance is achieved, along with the reflected resistance. The leakage inductance will have the value of $L_1$ in the 4th order filter.

Figure 11:
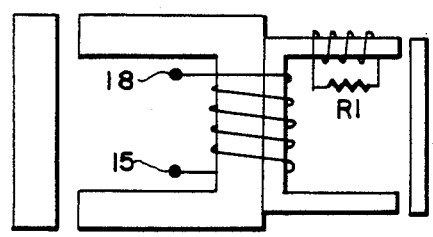

FIG. 11 shows another form of magnetic integration of the transformer T1 with a corresponding size reduction due to closed frame structure. Two C-I cores of different cross sectional area are placed next to each other as shown in FIG. 11. The fluxes in the two limbs are divided in proportion to the crossection of the two cores and the length of the airgaps to control the coupling coefficient. This configuration permits the use of cores with small airgaps to achieve the desired inductance value and the needed transformer action to reflect the resistance.

Figure 12:
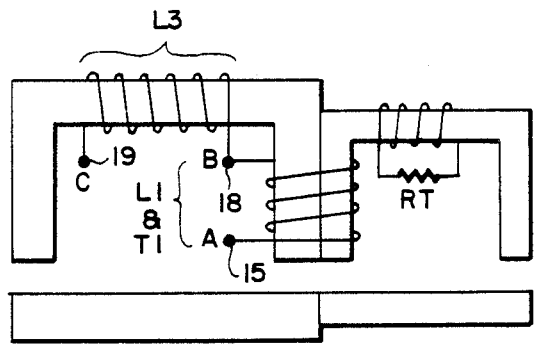
Figure 13:
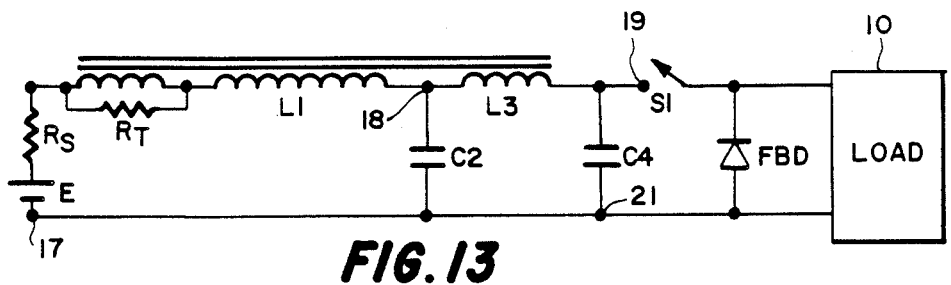
FIG. 13 is another, schematic diagram of a circuit embodying the invention.

The inductor L3 in the 4th order filter of FIG. 7A may be wound on the same core as $L_1$ and T1 as shown in FIG. 12. The primary winding of T1 is extended along one side of the core to form L1, between terminals 15 and 18. A winding othogonal to the winding forming T1 and L1, is then used to form L3. Integrating the inductances (L1 and L3) and transformer (T1) coupled resistor achieves the desired goals of size reduction, conventional design methods and use of standard available magnetic parts. A schematic diagram of the circuit of FIG. 7A with an inductance of the type shown in FIG. 12 for a 4th order filter is shown in FIG. 13.

In summary, in circuits embodying the invention a filter is implemented for a passive filter application. The required effective damping resistance (RT) is obtained through magnetic coupling and overall magnetic integration to achieve an optimum performance and cost effective filter configuration.

The circuit of the invention is extendable to other applications needing a passive input filter having low pass characteristic and requiring attenuation of unwanted high frequencies.

A few examples are:
(a) Input filter of a buck type switched mode converter which will reduce the conducted electromagnetic interference (EMI) within acceptable limits;
(b) Output filter of a switched mode power supply;
(c) Input and output filter of sine wave inverter power supply system, D.C. to D.C. converters and other like systems.

What is claimed is:

1. A direct current (d.c.) to direct current (d.c.) converter comprising:
   first and second power terminals for the application therebetween of a source of a direct current (d.c.) operating potential;
   a filter including an inductor and a capacitor;
   a transformer having a primary winding of $N_p$ turns and a secondary winding of $N_s$ turns;
   means for connecting said primary winding in series with said inductor of said filter between said first power terminal and a first terminal;
   means connecting said capacitor of said filter between a point on said inductor and said second power terminal for providing a shunt path whose impedance decreases as the frequency of the signals at said point increases;
   a load;
   switching means coupled between said load and said first terminal for selectively switching said load into and out of the circuit, said switching tending to produce current pulses and associated electromagnetic radiation;
   a resistor having an ohmic impedance R; and
   means for connecting said resistor across said secondary winding to produce an equivalent impedance across the primary winding of said transformer having a value approaching $(N_p/N_s)^2(R)$ in response to the transitions of the current pulses, tending to reduce electromagnetic radiation, and having a much lower value of impedance during steady state conditions.

2. A direct current to direct current converter as claimed in claim 1 wherein said inductor and said transformer are formed on a common magnetic frame.

3. A direct current to direct current converter as claimed in claim 1 wherein said switching means is repeatedly operated to apply power pulses to the load when the load is being operated.

4. The combination comprising:
   first and second power terminals for the application therebetween of a source of direct current (d.c.) power;
   a load;
   a filter providing a series conduction path connected between said first power terminal and a first terminal;
   switch means coupled between said first terminal and said load for, during the course of operation of said load, repeatedly applying the source of power across said load whereby power pulses are generated and associated therewith unwanted electromagnetic noise;
   wherein said filter for reducing the electromagnetic noise signals generated each time power is supplied to the load includes:
   inductive means for providing an inductive impedance in series with the primary winding of a transformer between said first power terminal and said first terminal, said transformer having a secondary winding, wherein the primary winding has Np turns and the secondary winding has Ns turns; and
   a resistor having an ohmic value equal to R ohms connected across said secondary winding for producing an effective series impedance across said primary winding having a value approaching $(N_p/N_s)^2(R)$, in series with said inductive impedance, during the transitions of said power pulses, whereby the rate of rise and fall of the power pulses in said series conduction path tend to be decreased, and approaching a significantly lower value during steady state operation, whereby the current amplitude in the series conduction path may be considerably greater than during the transitions of said power pulses.

5. The combination comprising:
   first and second power terminals for the application therebetween of a direct current (d.c.) source of operating potential;
   output means;
   a load;
   selectively enabled switch means coupled between the load and said output means for selectively and repeatedly connecting the load across said source of operating potential for supplying power pulses to the load and thereby generating unwanted electromagnetic noise;
   filter means coupled between said power terminals and said output means; said filter means comprising inductive means including the primary winding of a transformer for passing the current between said source of operating potential and said load, said transformer having a secondary winding; the primary winding of said transformer having Np turns and the secondary winding having Ns turns; and means for connecting a resistor having an ohmic impedance of R ohms across the secondary winding for producing an effective impedance across said primary winding approaching a value equal to $(Np/Ns)^2(R)$ during the transitions of said power pulses, whereby the rate of rise and fall of the current passing to said load tend to be decreased and thereby decreasing the electromagnetic noise being generated, and the impedance across said primary winding approaching a significantly lower value during steady state operation, whereby the d.c. current amplitude passing to said load can be considerably greater than during the transitions.

* * * * *